(12) United States Patent
Nakayama

(10) Patent No.: US 7,771,802 B2
(45) Date of Patent: Aug. 10, 2010

(54) OPTICAL COMPENSATION FILM, POLARIZING PLATE AND LIQUID CRYSTAL DISPLAY APPARATUS

(75) Inventor: Hajime Nakayama, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 910 days.

(21) Appl. No.: 11/606,331

(22) Filed: Nov. 30, 2006

(65) Prior Publication Data

US 2007/0132925 A1  Jun. 14, 2007

(30) Foreign Application Priority Data

Nov. 30, 2005  (JP) .............................. 2005-346428

(51) Int. Cl.
G02F 1/1335 (2006.01)
G02F 1/13363 (2006.01)

(52) U.S. Cl. .................... 428/1.31; 349/96; 349/117

(58) Field of Classification Search ................. 428/1.3, 428/1.31; 349/96, 117–121
See application file for complete search history.

(56) References Cited

U.S. PATENT DOCUMENTS

| | | | | |
|---|---|---|---|---|
| 3,053,147 A | * | 9/1962 | Blout | ........................ 359/491 |
| 6,740,409 B1 | * | 5/2004 | Granick et al. | ........... 428/411.1 |
| 7,550,557 B2 | * | 6/2009 | Haynie | ....................... 530/300 |

FOREIGN PATENT DOCUMENTS

| | | | |
|---|---|---|---|
| JP | 8-239398 A | 9/1996 | |
| JP | 9-292522 A | 11/1997 | |
| JP | 10-54982 A | 2/1998 | |
| JP | 2001-048993 | * | 2/2001 |

OTHER PUBLICATIONS

Tanaka et al.., A DNA-Lipid Complex in Organic Media and Formation of an Aligned Cast Film, Journal of the American Chemical Society, vol. 118, No. 44, Nov. 6, 1996.*
Chemical Communications, Journal of the Chemical Society, No. 18, Sep. 15, 1992, pp. 1279-1378.

* cited by examiner

*Primary Examiner*—Sophie Hon
(74) *Attorney, Agent, or Firm*—Buchanan Ingersoll & Rooney PC

(57) ABSTRACT

An optical compensation film having: a retardation value Re in a film plane of the optical compensation film; and a retardation value Rth in a thickness direction of the optical compensation film, the retardation value Re and Rth being reduced by an elongation, satisfying the formula (1) and (2) without the elongation, and satisfying the formula (3) to (6) after the elongation:

| | |
|---|---|
| $Re = 0$ to 30 nm | (1) |
| $Rth = -50$ to 50 nm | (2) |
| $Re(n) = -500$ to 0 nm | (3) |
| $Rth(n) = -800$ to 0 nm | (4) |
| $Re(n) - Re(0) < 0$ | (5) |
| $Rth(n) - Rth(0) < 0$ | (6). |

8 Claims, 2 Drawing Sheets

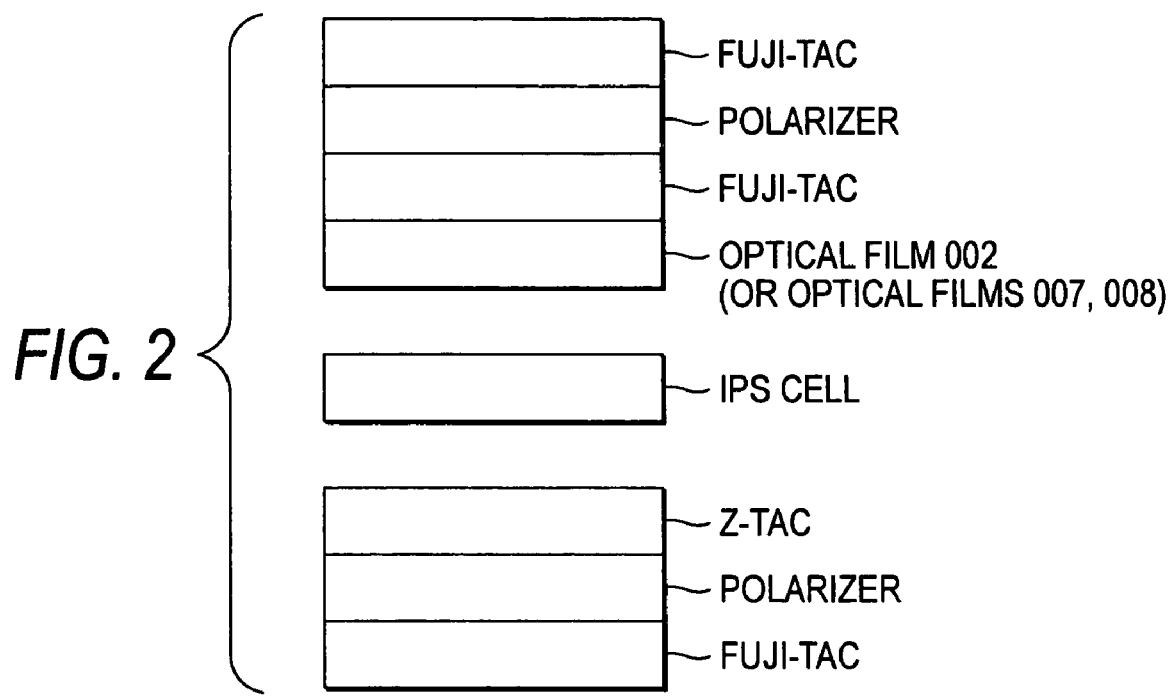
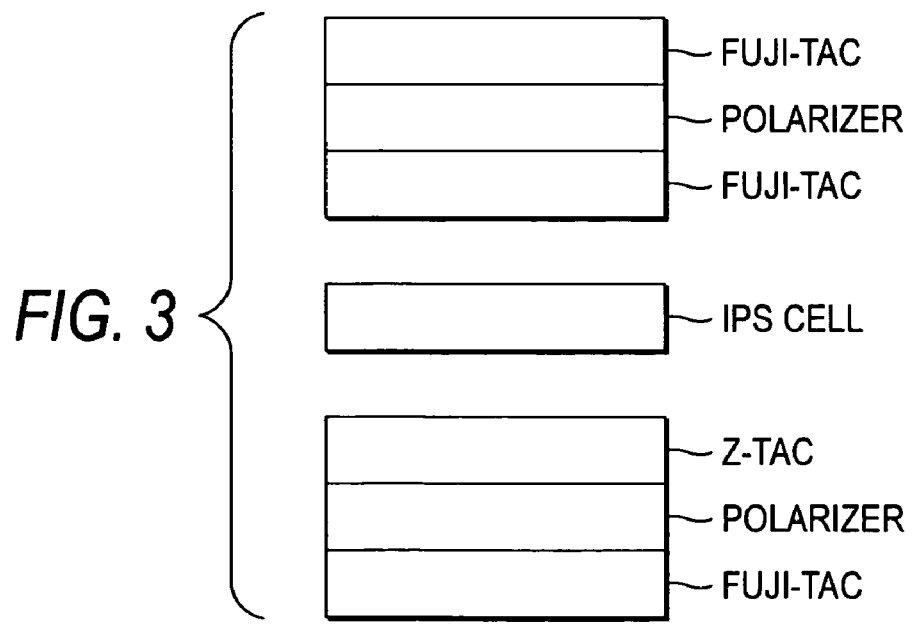

OPTICAL COMPENSATION FILM, POLARIZING PLATE AND LIQUID CRYSTAL DISPLAY APPARATUS

BACKGROUND OF THE INVENTION

1. Field of the Invention

The present invention relates to an optical compensation film, a polarizing plate and a liquid crystal display apparatus.

2. Background Art

The market of thin-type displays has been upsurging in recent years. Specifically, the enlargement of the market of liquid crystal display apparatuses is profound. Liquid crystal display apparatuses are under way of development for use not only in personal computer monitors but also for TV. Display size is therefore increasingly larger, so high definition has been investigated more actively. Accordingly, still more demands exist toward the improvement of the performances of individual members contained in liquid crystal display apparatuses.

In particular, IPS-mode liquid crystal display apparatus is promising as a liquid crystal display apparatus for large TV. As demands for high definition of IPS (In-Plane-Switching) mode, improvements of those described below are now desired: (1) contrast reduction due to the occurrence of "light leakage" when observed during black display along an oblique direction and (2) color change of images when observed during black display along an oblique direction.

As approaches to improve the viewing angle dependency of contrast and color in these two problems, it is proposed to arrange an optical compensation film with an optical anisotropic layer containing a polymer with negative inherent birefringence and a vertically oriented discotic liquid crystal. (See JP-A-10-54982 (the term "JP-A" as used herein means an "unexamined published Japanese patent application"), JP-A-9-292522) However, the optical performance demanded for an optical compensation film of IPS mode requires the increase of the refractive index along the film thickness direction, to adjust the retardation Rth along the film thickness direction to negativity. However, such performance has not yet been achieved in these films. Additionally, it is difficult to control the orientation along the film thickness direction. Thus, an appropriate optical compensation film with a negative Rth value has been desired.

SUMMARY OF THE INVENTION

It is an object of the invention to provide an appropriate optical compensation film with a larger refractive index along the film thickness direction and with a negative retardation Rth value along the film thickness direction, which is capable of preventing (1) the contrast reduction due to the occurrence of "light leakage" when observed during black display along an oblique direction and (2) the color change of images when observed during black display along an oblique direction; and an optical compensation film integral type polarizing plate and a liquid crystal display apparatus, using the same.

The invention is described as follows.

(1) An optical compensation film having: a retardation value Re in a film plane of the optical compensation film; and a retardation value Rth in a thickness direction of the optical compensation film, the retardation value Re and Rth being reduced by an elongation, satisfying the formulae (1) and (2) without the elongation, and satisfying the formulae (3) to (6) after the elongation:

$$Re = 0 \text{ to } 30 \text{ nm} \quad (1)$$

$$Rth = -50 \text{ to } 50 \text{ nm} \quad (2)$$

$$Re(n) = -500 \text{ to } 0 \text{ nm} \quad (3)$$

$$Rth(n) = -800 \text{ to } 0 \text{ nm} \quad (4)$$

$$Re(n) - Re(0) < 0 \quad (5)$$

$$Rth(n) - Rth(0) < 0 \quad (6)$$

wherein in the formula (3), Re is represented as positive value in an elongation direction and as negative value in a direction perpendicular to the elongation direction; in the formula (4), Rth is represented as negative value when a refractive index in the thickness direction is larger than a refractive index in the film plane direction; in the formulae (5) and (6), n represents an elongation ratio (%); and Re and Rth after the elongation at n % are represented as Re(n) and Rth(n), respectively.

(2) An optical compensation film as described in the item (1), wherein the retardation value Re and Rth after elongation satisfy the formulae (7) and (8):

$$|Re(n)/d(n)| \geq 0.001 \quad (7)$$

$$|Rth(n)/d(n)| \geq 0.001 \quad (8)$$

wherein in the formulae (7) and (8), d(n) represents the film thickness (nm) of the optical compensation film when the elongation ratio is n (%).

(3) An optical compensation film as claimed in the item (1), which comprises a raw material polymer, wherein the raw material polymer comprises a polymer having a helix structure.

(4) An optical compensation film as described in the item (3), wherein the polymer having the helix structure has a side-chain component extended in a direction intersecting with the helix axis at one of an internal and an external side of the helix structure.

(5) An optical compensation film as described in the item (4), wherein the side-chain component is an ultraviolet absorption group in a plane form perpendicular to the helix axis.

(6) An optical compensation film as described in any one of the items (3) to (5), wherein the polymer having the helix structure comprises at least one of a nucleic acid and a nucleic acid derivative.

(7) An optical compensation film as described in the item (6), wherein at least one of the nucleic acid and the nucleic acid derivative is a compound derived from a deoxyribonucleic acid.

(8) An optical compensation film as described in the item (7), wherein the compound derived from the deoxyribonucleic acid comprises a deoxyribonucleic acid-lipid complex obtained by electrostatically allowing the phosphate anion part of the deoxyribonucleic acid to interact with a cationic lipid.

(9) An optical compensation film as described in the item (7) or (8), wherein the compound derived from the deoxyribonucleic acid is oriented along the elongation direction by the elongation of the optical compensation film, and the optical compensation film has a slow axis along a direction perpendicular to the elongation direction.

(10) An optical compensation film according to any one of the items (3) to (8), which is produced by mixing the raw material polymer with another polymer.

(11) A polarizing plate comprising: an optical compensation film according to any one of the items (1) to (10); and a polarizing plate stacked onto the optical compensation film.

(12) A liquid crystal display apparatus comprising: at least one of an optical compensation film according to any one of the items (1) to (10); and a polarizing plate according the item (9).

(13) A liquid crystal display apparatus as described in the item (12), wherein the liquid crystal cell is of In-Plane-Switching mode.

(14) An optical compensation film described above in any one of the items (1) to (10), wherein the optical compensation film is obtained by subjecting a raw material polymer for the film to solution filming by a solvent cast process.

(15) An optical compensation film described above in any one of the items (1) to (10), wherein the optical compensation film is obtained by a melt-filming process comprising heating and melting a raw material polymer for the film.

(16) An optical compensation film described above in any one of the items (1) to (10), wherein the optical compensation film is produced at a filming width of 0.2 m to 2 m and a continuous product length of 5 to 5,000 m.

(17) An optical compensation film described above in any one of the items (1) to (10), wherein the film thickness is 10 to 200 μm.

(18) An optical compensation film described above in any one of the items (1) to (10), wherein the transmittance is 85% or more.

(19) An optical compensation film described above in any one of the items (1) to (10), wherein the haze is at 0.01 to 2.0%.

In accordance with the invention, there are provided an optical compensation film capable of preventing (1) the contrast reduction due to the occurrence of "light leakage" when observed during black display along an oblique direction and (2) the color change of images when observed during black display along an oblique direction, and an optical compensation film integral type polarizing plate and a liquid crystal display apparatus, using the same.

BRIEF DESCRIPTION OF THE DRAWINGS

The invention disclosed herein will be understood better with reference to the following drawings of which:

FIG. 2 is a view depicting the layer structure (with optical compensation film) in liquid crystal display apparatus; and FIG. 3 is a view depicting the layer structure (without optical compensation film) in liquid crystal display apparatus.

DETAILED DESCRIPTION OF THE INVENTION

Figure 1:
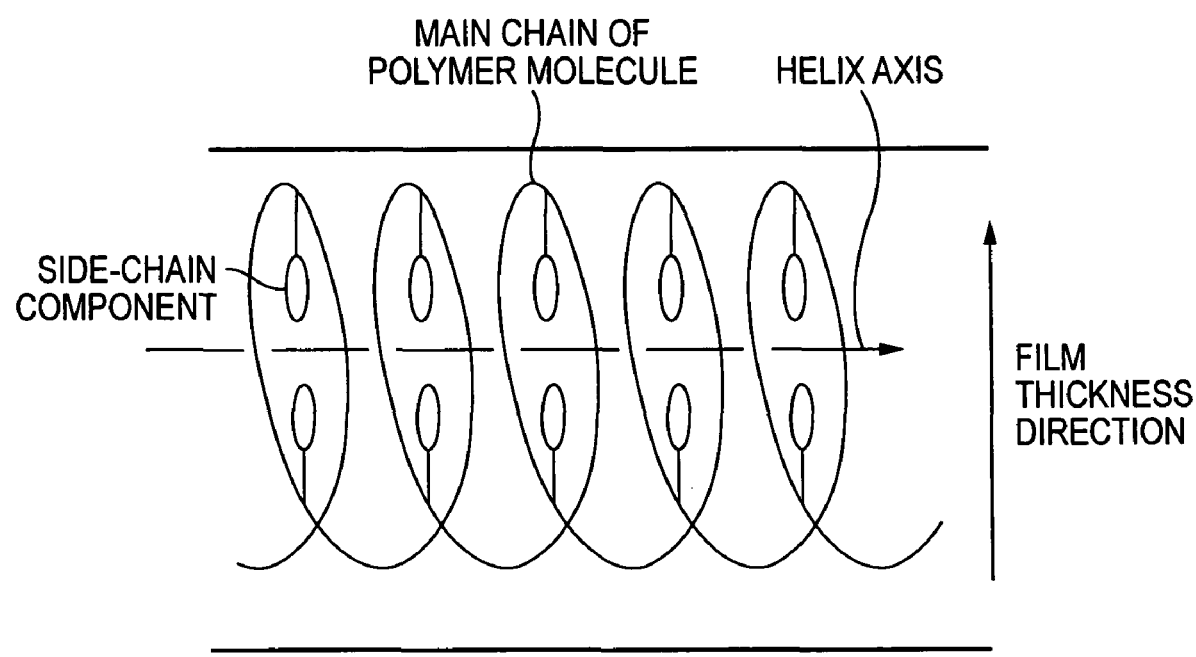
FIG. 1 is a view depicting the helix structure.

The present inventors made investigations. Consequently, the inventors found that so as to obtain the optical compensation film of the invention by controlling the refractive index along the film thickness direction, a raw material polymer composing the film has a helix structure and also has a characteristic structural feature such that the polymer has a side-chain component being unparallel to the helix axis and having polarization anisotropy inside or outside the helix structure, for example an ultraviolet absorption group in a plane form approximately orthogonal to the helix axis. Generally, the main chain of polymer tends to overlay together in a layer form in films, generally along the film thickness direction, which raises the in-plane refractive index. When the polymer has a helix structure within the molecule and is in a structure such that the polymer has an ultraviolet absorption group in a plane form approximately orthogonal to the helix axis inside or outside the helix structure, the helix structure of the main chain laminates together in a layer form and simultaneously, an ultraviolet absorption group in a plane form approximately orthogonal to the helix axis orients the plane along a direction approximately orthogonal to the film thickness direction. Thus, the refractive index along the film thickness direction can be raised.

Among polymers with such structural characteristic features, the inventors found DNA (deoxyribonucleic acid) molecule as one of desirable ones. As is well known, DNA is a molecule responsible for genetic information in biological organisms and is an ultra-high molecular substance of several tens millions to several hundreds millions. It is known that DNA has a double-helix structure. DNA is a biological substance in a specific structure never prepared from synthetic polymers. So as to modify such DNA for use as a material, it is required to extract DNA from biological organisms and subsequently discard impurities from the resulting DNA and to modify DNA to a molecular weight readily usable. By such discarding and extraction procedures, currently, DNA is extracted from sperm of fishes and shellfishes such as salmon, herring and scallop and from calf thymus, for use as an additive for health foods, cosmetics and the like. However, such DNAs are so water-soluble that it has been difficult to use them as they are as industrial materials.

Okabatake, et al. (J. Chem. Soc., Chem. Commun., 1992, 1339, Official gazette of JP-A-8-239398) found that by subjecting water-soluble substances such as sodium salt and potassium salt of DNA to ion exchange with quaternary ammonium salt and the like, a water-insoluble DNA/lipid complex film could be produced while the DNA/lipid complex film retained the double-helix structure. However, currently, absolutely no idea about the use of any DNA/lipid complex film as a structural member of liquid crystal display apparatus has been found.

Recently, a disposal problem of plastic materials, particularly waste disposal of disposable materials so far disposed has been an important issue, so the same problem will possibly be remarked in future for the structural materials of liquid crystal display apparatus. The use of biological DNA molecules may possibly make a contribution to the resolution of the problem described above.

The invention is now described in detail in modes for carrying out the invention hereinbelow.

(Film with Negative Inherent Birefringence)

In case of film elongation causing retardation orthogonal to the elongation direction, it is said that the film has so-called negative inherent birefringence. As the specific polymers, styrene-series polymers with side chains with high polarization ratios are reported (see JP-A-10-54982). It is known that the in-plane retardation Re in so-called transparent optical films (sheets) with negative inherent birefringence is expressed along a direction orthogonal to the elongation direction. However, not any polymer involving the decrease of retardation Rth along the film thickness direction in the course of elongation has been found yet. This is due to the fact that in a polymer with a side chain with a higher polarization ratio than that of the main chain, the side chain is oriented in-plane along a direction approximately orthogonal to the main chain, as the main chain is oriented in-plane. Both the main chain and the side chain make contributions to the increase of the refractive index along the in-plane direction, without the increase of the refractive index along the film thickness direction. Therefore, the retardation Rth along the film thickness direction cannot be reduced.

(Optical Compensation Film Involving the Decrease of Both Re and Rth Due to Elongation)

So as to obtain an optical compensation film involving the decrease of not only Re but also Rth due to elongation, it is required to orient and control a functional group with polarization anisotropy along the film thickness direction, by elongation. In other words, it is required that the functional group with polarization anisotropy is never "down" toward the in-plane direction but "stands" along the film thickness direction. Therefore, some orientation-controlling force is required because side chains in polymers of general side chain type are likely free and therefore "down".

(Polymer with Helix Structure)

Accordingly, a raw material polymer principally forming the film has preferably such a structure that the polymer is helical within the molecule; i.e. that the polymer has a so-called helix structure. As shown in FIG. 1, generally, the main chain of polymer molecule is likely to be normally in-plane oriented in the film plane. Even when the polymer is at a "down" state, in this case, the refractive index along the film thickness direction can be raised, if the polymer is helical and preferably if the side chain component "stands" along a direction approximately orthogonal to the helix axis.

The "standing" side-chain component may exist in any side of the inside or the outside of the helix structure. From the respect of maintaining the helix structure and the structure of the side-chain component, a structure with the side-chain component inside the helix structure is more preferable. In any way, the polymer with the helix structure desirably has a side-chain component unparallel to the helix structure, preferably a side-chain component approximately orthogonal to the helix structure. The term "approximately orthogonal" means that the side-chain component is unparallel to the helix axis and "stands" at a certain angle. Specifically, the term represents that the side-chain component is at a state with 5° to 90° from the helix axis.

So as to allow the "standing" side-chain component to raise the refractive index along the film thickness direction, essentially, the side-chain component itself has a polarization ratio. In other words, the side-chain component essentially has a polarization ratio along a different direction from that of the polarization ratio of the main polymer chain. Therefore, the side-chain component advantageously comprises an organic component with some absorption band. Preferably, the side-chain component has an ultraviolet absorption group in a plane form.

Specifically, any material with the structure with the helical main polymer chain and with an effective side-chain component is satisfactory, with no specific limitation.

In an approach for preparing a polymer with a helix structure from synthetic polymers, it has been known so far that at a crystalline state, isotactic polypropylene and polystyrene form a pair of clockwise and counterclockwise helixes. For the optical compensation film of the invention, a racemic polymer with such helix structure may satisfactorily be used.

A great number of research works have been done in the field of so-called "ultra-molecular chemistry" about material examples with effective side-chain components, including for example a polymer with a helix structure comprising a repeat structure of pyridine and pyrimidine (Angew. Chem. Int. Ed. 36, 1845 (1997)); a helical oligomer of phenylacetylene type (Science 277, 1793 (1997)); and an example of alternately aligning an electron donor and an electron acceptor with larger polarization ratios along a direction orthogonal to the longitudinal direction of the main chain (Nature 375, 303 (1995)). These materials can be prepared singly into film as long as the materials individually have a larger molecular weight. When the materials individually have a smaller molecular weight, the materials may be mixed with other polymers to be elongated as film. Thus, these materials can preferably be used as a material for the optical compensation film of the invention.

Approaches comprising mixing a polymer forming a helix with another polymer, namely so-called polymer blend approach and polymer alloy approach may effectively be used. Another polymer to be mixed into the film preferably includes but is not limited to any widely applicable polymers with greatness in terms of for example transparency, mechanical strength and thermal stability. Within a range satisfying the formula described above, any polymer may be mixed and used satisfactorily. For example, the polymer is a polycarbonate-series polymer, a polyester-series polymer such as polyethylene terephthalate and polyethylene naphthalate, an acrylic polymer such as polymethyl methacrylate, and a styrene-series polymer such as polystyrene and acrylonitrile/styrene copolymer (AS resin). Additionally, the polymer includes for example polyolefin-series polymers such as polyolefin for example polyethylene and polypropylene, and ethylene/propylene copolymer, vinyl chloride-series polymers, amide-series polymers such as nylon and aromatic polyamine, imide-series polymers, sulfone-series polymers, polyether sulfone-series polymers, polyether ether ketone-series polymers, polyphenylene sulfide-series polymers, vinylidene chloride-series polymers, vinyl alcohol-series polymers, vinyl butyral-series polymers, acrylate-series polymers, polyoxymethylene-series polymers, epoxy-series polymers, or polymers as mixtures of the above described polymers. The transparent film in accordance with the invention may be formed as a setting layer for resins of ultraviolet-setting type and thermo-setting type, such as acrylic-, urethane-series-, acrylurethane-series-, epoxy-series- and silicone-series resins. Additionally, thermoplastic norbornene-series resins may preferably be used. The thermoplastic norbornene-series resins include for example Zeonex and Zeonor manufactured by Zeon Corporation, and Arton manufactured by JSR Corporation. Additionally, the cellulose-series polymer (also referred to as cellulose acrylate) typically including triacetyl cellulose for conventional use as a transparent protective film for polarization plate may also be used preferably.

It is known that numerous polymers naturally occurring are helical. Naturally occurring glycopolymers typically including amylose and cellulose can be used in accordance with the invention. These glycopolymers contain plural side-chain hydroxyl groups in the 6-membered, 5-membered and 4-membered rings thereof. The side-chain hydroxyl groups may have substituents comprising hydrocarbon chains, such as acetate, propionate and butyrate. More active polarization anisotropy may be given via substituents with aromatic rings, such as benzyl group and naphthyl group.

Nucleic acids and derivatives thereof, such as DNA with deoxyribose as a 5-membered ring and RNA with ribose as a 5-membered ring, may also be considered as one type of naturally occurring saccharides. It is well known since the discovery of the molecular structure that these are in stable double-helix structure, where the nucleotides of the nucleic acids are ultraviolet absorbing functional groups in plane forms and exist approximately orthogonally to the helix axis. Therefore, these can preferably be used as polymer materials for the optical compensation film of the invention.

It is also well known that not saccharides but peptides and proteins as amino acid-condensed polymers are also helical. The helix structure designated so-called α-helix is such an excellent structure that amino acid-condensed amide groups form a hydrogen bond longitudinally along the helix axis, to stabilize the helix. Peptides and proteins containing abundant amino acids advantageous for giving polarization anisotropy to the side chain, for example phenylalanine, tyrosine and tryptophan as aromatic amino acids, are preferable as raw material polymers for use in accordance with the invention.

As the amino acid-derived polymer, synthetic peptides from non-natural origins may preferably used in accordance with the invention. Specifically, it is known that polybenzyl-L-glutamate prepared by introducing benzyl ester into glutamic acid, as well as polydodecyl/benzyl-L-glutamate prepared by introducing dodecyl group instead of benzyl group into a part of glutamic acid and then copolymerizing the resulting product with polybenzyl-L-glutamate, shows liquid crystallinity. Since these are also helical and have polarization anisotropy effective as the side-chain component, these may also be used preferably as the raw material polymers in accordance with the invention.

The raw material polymer forming the optical compensation film of the invention may be any material satisfying the conditions described above and also satisfying the Re and Rth values in accordance with the invention before and after elongation, with no limitation to the polymer with such side-chain component. An assembly in a form of a mimetic polymer prepared by "self assembly" can effectively be used. When for example a fiber structure prepared by stacking phthalocyanine as a disk-like compound together in a cylinder shape and subsequent self assembly (Science 284, 785 (1999)) and a columner structure prepared by allowing an axially asymmetric helicene compound to be helical to form a self-assembly are retained in-film and are materials satisfying the Re and Rth values before and after elongation in accordance with the invention, these may also be used in accordance with the invention. By orienting via elongation a cylinder molecule such as carbon nano-tube with a compound with some ultraviolet absorption in orientation involving then the reduction of both Re and Rth during the elongation, similarly, the resulting molecule can preferably be used in accordance with the invention.

(Assessment of Helix)

The helical property of the polymer with the helix structure in accordance with the invention can be verified by circular dichroism spectrometry. Specifically, a chloroform solution containing a raw material polymer for the optical compensation film of the invention at 0.01% by mass is prepared; this is then placed in a quartz cell of 1 cm×1 cm and then assayed using J-720 manufactured by JASCO Corporation. In accordance with the invention, the main chain or the side-chain structure with an absorption band as arranged inside or outside the helix is involved in the circular dichroism spectrometry due to the helical winding. Via the helical winding, circular dichroism in the absorption band region of the functional group with the absorption can be observed as positive or negative Cotton effect.

In case of a compound with an absorption band in the ultraviolet region, for example in case of selecting a nucleic acid- or nucleic acid derivative compound as a raw material polymer for the optical compensation film of the invention, the absorption of the nucleotides of the nucleic acid can be verified on the basis of the Cotton effect at 260 nm in the ultraviolet region. In case that amino acid-polymerized peptides or proteins are selected as raw material polymers of the optical compensation film of the invention, the helical property can be verified on the basis of the Cotton effect at 225 nm. In accordance with the invention, as described above, an absorption wavelength appropriate for the polymer as the main material of the optical compensation film is selected to verify the helix structure on the basis of the presence or absence of the Cotton effect on the circular dichroism spectrum in the absorption band. Additionally, the direction of the helix axis in the raw material polymer for the optical compensation film of the invention coincides with the orientation direction of the main chain of the raw material polymer. As the method for orienting the main polymer chain, there may be used any methods for use in orienting the main chain for polymer film, including an orientation method by film elongation, an orientation method by shearing, an orientation method in magnetic field, and an orientation method in electric field. As the method for verifying the orientation of the main polymer chain, namely as the method for verifying the direction of the helix axis, there may be used any methods for verifying the orientation state of polymer film, including for example a method for determining the orientation direction of the main chain by X-ray diffraction, and a method for determining the orientation direction by absortiometry in ultraviolet-, visible-, infrared regions and by Raman spectrometry, along longitudinal and crosswise directions.

(DNA-Derived Compounds)

DNA-derived polymer compounds preferable for use as a raw material polymer for preparing the optical compensation film of the invention are now described below.

The DNA-derived compounds preferable for use in accordance with the invention comprise a DNA/lipid complex prepared by allowing the phosphate anion part of DNA to interact with a cationic lipid in an electrostatic manner. Such material can be obtained by the method disclosed by Okabatake, et al. as described above. Specifically, the DNA/lipid complex is a DNA/lipid complex obtained by subjecting water-soluble substances such as known DNA-sodium salts and potassium salts extracted from sperm of fishes such as salmon and herring or shellfishes such as scallop and from calf thymus to ion exchange with a quaternary ammonium salt with a long-chain alkyl group. These are soluble in organic solvents such as alcohol-series and halogen-series.

The DNA-sodium salts and potassium salts extracted and purified from the fishes and shellfishes can be prepared into molecular weights of several millions base pairs or smaller (base pair is abbreviated as "bp" hereinafter) during the treatment course thereof. So as to use the resulting product as the DNA-derived compound soluble in organic solvents in accordance with the invention, the resulting product should have an average molecular weight of preferably 100,000 bp to 100 bp, particularly preferably 50,000 bp or smaller to 200 bp. When the average molecular weight is above 100,000 bp, the resulting solution is so highly viscous that the preparation of the lipid complex involves laborious works and the solubility of the resulting lipid complex in solvents is reduced, causing difficulty in using the lipid complex. When the average molecular weight is less than 100 bp, it is very difficult for the resulting DNA/lipid complex to acquire sufficient self-support potential as film.

The molecular weight of the DNA-sodium salt and potassium salt and the like can be assayed by gel electrophoresis using agarose gel for general use. The base pair herein referred to corresponds to one unit of a pair of DNA molecule bases for forming hydrogen bond, namely one monomer unit referred to for general polymers.

It is known that base pairs in a DNA material with a double-helix structure are generally intercalated with an organic dye compound in a plane structure. The same performance is found even in DNA-lipid complexes (J. Chem. Soc., Chem. Commun., 1992, 1339, Langmuir, 1993, 9, 19).

For the optical compensation film of the invention, a DNA-derived polymer compound preliminarily intercalated with an organic dye compound with a specific absorption wavelength may be used, by actively utilizing such characteristic feature. This makes desirable the optical performance of the optical compensation film of the invention.

(Cationic Lipid Compound)

So as to prepare a water-insoluble DNA/lipid complex by the ion exchange of water-soluble substances such as DNA-sodium salt and potassium salt, cationic lipid compounds are effective. The term "cationic lipid compound" means amphoteric detergents with cationic ion species and concurrently with hydrophobic side chains. As specific cationic lipid compounds, quaternary ammonium salts with long-chain alkyl groups are effective and include those described below as represented by the following formula (1) or (2).

Quaternary ammonium salts represented by the following formula (1) or (2) are generally used as halides and can thus be dispersed in water. Therefore, quaternary ammonium salts are mixed with DNA-sodium salts and the like in water for lipid exchange, to obtain such DNA/lipid complex.

(1)

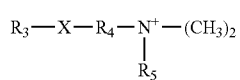

(2)

In the formulas, $R_1$ and $R_3$ may be a long-chain alkyl group or may represent a functional group with a specific structure if necessary; $R_2$ and $R_4$ represent a long-chain alkyl group; $R_5$ represents a long-chain alkyl group; X represents a binding group such as single bond, O, S, NH, CO, $CO_2$, $OCO_2$, SO, $SO_2$, CONH or COONH.

The long-chain alkyl group in the quaternary ammonium salt represented by the formula (1) or (2) above includes aliphatic hydrocarbon groups with 6 or more carbon atoms, preferably 8 to 23 carbon atoms in particular. In other words, a DNA/lipid complex using a quaternary ammonium salt with one or two alkyl groups with 8 to 23 carbon atoms is preferable. The DNA/lipid complex using such quaternary ammonium salt is water-insoluble and has better solubility in organic solvents. Additionally, quaternary ammonium salts with aromatic ring as a substituent or the like may be used.

Specifically, the quaternary ammonium salts include quaternary ammonium salts with one long-chain alkyl group, such as n-hexyltrimethylammonium chloride, n-heptyltrimethylammonium chloride, n-octyltrimethylammonium chloride, n-nonyltrimethylammonium chloride, n-decyltrimethylammonium chloride, n-undecyltrimethylammonium chloride, dodecyltrimethylammonium chloride, n-tridecyltrimethylammonium chloride, myristyltrimethylammonium chloride, n-pentadecyltrimethylammonium chloride, cetyltrimethylammonium chloride, n-heptadecyltrimethylammonium chloride, stearyltrimethylammonium chloride, n-nonadecyltrimethylammonium chloride, arachidyltrimethylammonium chloride, n-heneicosyltrimethylammonium chloride, behenyltrimethylammonium chloride, and n-tricosyltrimethylammonium chloride, and products obtained by substituting the chloride in these compounds with bromide; quaternary ammonium salts with two long-chain alkyl groups, such as di-n-hexyldimethylammonium chloride, di-n-heptyldimethylammonium chloride, di-n-octyldimethylammonium chloride, di-n-nonyldimethylammonium chloride, di-n-decyldimethylammonium chloride, di-n-undecyldimethylammonium chloride, dilauryldimethylammonium chloride, di-n-tridecyldimethylammonium chloride, dimyristyldimethylammonium chloride, di-n-pentadecyldimethylammonium chloride, dicetyldimethylammonium chloride, di-n-heptadecyldimethylammonium chloride, distearyldimethylammonium chloride, di-n-nonadecyldimethylammonium chloride, diarachidyldimethylammonium chloride, di-n-heneicosyldimethylammonium chloride, dibehenyldimethylammonium chloride, and di-n-tricosyldimethylammonium chloride, and products obtained by substituting the chloride in these compounds with bromide; quaternary ammonium salts with one to 4 ether bonds or oxyethylene groups, in a part of the one or two long-chain alkyl groups; aromatic ring-containing quaternary ammonium salts such as phenyldimethylcetylammonium chloride, benzyldimethylcetylammonium chloride, and products obtained by substituting the chloride in these compounds with bromide; and quaternary pyridinium salts such as cetylpyridinium chloride and products obtained by substituting the chloride in these compounds with bromide.

When the DNA-derived compounds and the quaternary ammonium salts are mixed together in water, the DNA/lipid complex is precipitated. By recovering the precipitate and sufficiently drying the precipitate to remove water, the resulting water-insoluble DNA/lipid complex can be obtained. In the DNA/lipid complex, herein, the phosphate anion of DNA and the cation of the quaternary ammonium salt are bonded together at a binding ratio of 1:1 (see JP-A-9-292522, JP-A-8-239398).

(Preparation of Optical Compensation Film)

For example, the process of preparing the optical compensation film of the invention using the various raw material polymers described above comprises uniformly dissolving such raw material polymer in a solution and then carrying out solution filming using the resulting solution or comprises heating and melting such raw material polymer for melt filming.

(Solution Filming)

The organic solvent for dissolving the raw material polymer is preferably selected, taking account of the solubility. As the organic solvent, there may be used alcohols such as methanol, ethanol and isopropanol; halogenated alcohols such as hexafluoroisopropanol; ketones such as acetone, methyl ethyl ketone and cyclohexanone; amides such as N,N-dimethylformamide and N,N-dimethylacetamide; pyrrolidones such as N-methylpyrrolidone; sulfoxides such as dimethylsulfoxide; ethers such as tetrahydrofuran, dioxane and ethylene glycol monomethyl ether; aliphatic halogenated hydrocarbon compounds such as chloroform, methylene chloride, dichloroethane, dichloroethylene, carbon tetrachloride, and trichloroethylene; or aromatic compounds such as toluene, xylene, monochlorobenzene and dichlorobenzene.

Depending on the use, various additives (for example, compounds reducing optical anisotropy, agents for adjusting wavelength scattering, ultraviolet protective agents, plasticizers, deterioration-preventing agents, microfine particles, and agents for modifying optical properties) may be added to the solution of the raw material polymer.

Specific methods for solution filming include a process comprising casting on a support substrate with surface smoothness such as metal plate, with no specific limitation. Therefore, processes such as cast process using geesa and various coating processes using blade may appropriately be used for solution filming. Solvents can be dried at ambient temperature or can be dried under heating, depending on the boiling point of a solvent used. Heating and drying can be done within a temperature range of 30 to 200° C. for about 5 minutes to 2 hours, while the solution is left to stand alone or is left in air stream, depending on the desired dry state. The raw material polymer is dried within a temperature range of preferably ambient temperature to 200° C., more preferably ambient temperature to 170° C., still more preferably ambient temperature to 150° C. At a temperature above 150° C., lipid dissolution or decomposition of main polymer chain or the like may possibly cause the deterioration of the film properties.

Specific process for producing the optical compensation film of the invention by solution filming includes for example, a solution cast filming process and a solution cast filming apparatus for traditional use in producing cellulose acetate film for liquid crystal display apparatus. The solution prepared by dissolving a raw material polymer is once taken out of a dissolution machine (caldron) and stored in a storage caldron; then, foam contained in the solution is removed for final preparation. Feeding the solution from the discharge port through a pressure type constant gear pump capable of constant feeding regulated at a high precision due to rotation number to a pressure die, the dope is uniformly cast on a metal support at a cast part endlessly running from the orifice (slit) of the pressure die; at a peel point located for the metal support to make an almost overall round, semi-dried film (called web) is peeled off from the metal support. Both the ends of the resulting web are pinched with clips and transferred with a tenter while retaining the width, for drying; continuously, the web is transferred with a roll group of a drying apparatus, to terminate drying; and then, the web is taken up with a take-up machine to a given length. A combination of the tenter and a roll group of the drying apparatus varies depending on the purpose. The solution cast filming process for use in the optical member of a liquid crystal display apparatus as a main application of the optical compensation film of the invention is described in the Published Technical Report from the Japan Institute of Invention and Innovation (Kogi No. 2001-1745, issued on Mar. 15, 2001, the Japan Institute of Invention and Innovation), page 25 to page 30. The publication describes the process divided in casting (including co-casting), metal support, drying and peeling. The process is preferably used in accordance with the invention.

(Melt Filming)

The process of producing the optical compensation film of the invention may be melt filming. Raw materials such as raw material polymer and additives are melted under heating, which may then be prepared into film by extrusion injection molding. Otherwise, the raw materials are inserted in between two heated plates, for press processing for filming.

The temperature for melting under heating is any temperature for uniformly melting the raw material polymer, with no specific limitation. Specifically, the raw material polymer is heated to a temperature of the melting point or softening point thereof or higher. So as to obtain a uniform film, the raw material polymer is preferably heated and melted to a temperature higher than the melting point of the raw material polymer, preferably a temperature by 5 to 40° C. higher than the melting point, particularly preferably by 8 to 30° C. higher than the melting point.

(Film Elongation)

The optical compensation film of the invention exerts an appropriate optical performance through an elongation procedure. A preferable elongation process for the optical compensation film of the invention may be uniaxial elongation or biaxial elongation. Known elongation processes may preferably be used. Further, no limitation is imposed to the conditions during elongation. Heat is given to a film during film elongation to heat the film to a temperature slightly higher than Tg, to soften and elongate the film. By plasticizing the film with an appropriate plasticizer, the resulting film may be elongated. Additionally, the film may be softened by allowing the film to contain an appropriate solvent including water, for elongation.

The film prepared by solution filming can be elongated during a drying process. The process is effective, particularly when solvents remain. When the speed of film transfer roller is adjusted to make the film take-up speed larger than the film peel speed, the film is elongated along the transfer direction. By a process of gradually enlarging the film width by retaining the film width with a tenter, the film can be elongated along the width direction. Additionally, off-line elongation using an elongation machine after film drying (preferably uniaxial elongation using a long elongation machine) is also possibly done.

Similarly, even a film prepared by melt filming can be elongated along the transfer direction, by controlling the temperature during the transfer course after filming to adjust the speed of the transfer roller to make the film take-up speed larger than the film delivery speed. The film can also be elongated along the width direction by a process of enlarging the width by retaining the film with a tenter. Additionally, off-line elongation using another elongation machine after take-up may also be done.

The film elongation ratio (the ratio of the increment due to elongation to the original length) is preferably 0.5 to 300%, more preferably 1 to 250%, particularly preferably 5 to 180%.

(Film Width for Filming, Continuous Length)

Preferably, the filming width of the optical compensation film of the invention is 0.2 m to 2 m, while the continuous product length is 5 to 5,000 m. More preferably, the filming width of the optical compensation film of the invention is 0.3 m to 1.7 m, while the continuous product length is 10 to 4000 m. Still more preferably, the filming width of the optical compensation film of the invention is 0.4 m to 1.5 m, while the continuous product length is 50 to 3,000 m.

(Film Thickness)

The film thickness of the optical compensation film of the invention is preferably 10 to 200 µm. More preferably, the film thickness thereof is 10 to 150 µm. Still more preferably, the film thickness thereof is 10 to 80 µm.

(Film Transmittance)

The transmittance of the optical compensation film of the invention is preferably 85% or more. The transmittance is more preferably 88% or more, still more preferably 90% or more. The transmittance was measured as the transmittance of visible light (615 nm), using a sample of 20 mm×70 mm from the optical compensation film of the invention at 25° C. and 60% RH with a transmittance meter (AKA phototube colorimetric meter, KOTAKI Seisakusho).

(Film Haze)

Importantly, the optical compensation film of the invention has less haze; ie. the optical compensation film of the invention is transparent from the respect of the use in liquid crystal display apparatus. The haze of the optical compensation film of the invention is preferably at 0.01 to 2.0%. The haze is more preferably at 0.01 to 1.5%, still more preferably at 0.01 to 1.0%. The haze was measured with a sample of 40 mm×80 mm from the optical compensation film of the invention at 25° C. and 60% RH, with a haze meter (HGM-2DP, Suga Test Machine) according to JIS K-6714.

(In-Plane Retardation Re, Retardation Rth Along Film Thickness Direction)

Re referred to in accordance with the invention is measured by adjusting the moisture in a film sample of 30 mm×40 mm at 25° C. and 60% RH for 2 hours, and injecting light at a 589-nm wavelength along the film normal direction with an automatic birefringence analyzer (KOBRA-21ADH, manufactured by Oji Scientific Instruments) Rth is calculated with KOBRA-21DH on the basis of retardation values measured along a total of three directions, namely the Re described above, a retardation value measured while injecting light of a 589-nm wavelength from a direction slanted by +40° toward the film normal direction, using the in-plane slow axis (determined with KOBRA-21DH) as an oblique axis (rotation axis), and a retardation value measured while injecting light of a 589-nm wavelength from a direction slanted by −40° toward the film normal direction, using the in-plane slow axis (determined with KOBRA-21DH) as an oblique axis (rotation axis).

At the time of no elongation, the optical compensation film of the invention has the in-lane retardation Re of 0 to 30 nm and the retardation Rth along the film thickness direction of −50 to 50 nm. Preferably, the optical compensation film of the invention with no elongation has the in-lane retardation Re of 0 to 20 nm and the Rth of −40 to 40 nm. More preferably, the optical compensation film of the invention with no elongation has the in-lane retardation Re of 0 to 10 nm and the Rth of −30 to 30 nm.

For the optical compensation film of the invention, Re and Rth are both reduced by elongation.

After elongation, the optical compensation film of the invention has the in-lane retardation Re of −300 to 0 nm and the retardation Rth along the film thickness direction of −400 to 0 nm. Preferably, the optical compensation film of the invention after elongation has the in-lane retardation Re of −250 to 0 nm and the Rth after elongation along the film thickness direction of −350 to 0 nm. More preferably, the optical compensation film of the invention after elongation has the in-lane retardation Re of −200 to 0 nm and the retardation Rth along the film thickness direction of −300 to 0 nm.

(Physico-chemical Properties of Film After Elongation)

In the optical compensation film of the invention, preferably, the polymer therein is aligned along one direction by elongation. Generally, the alignment of the main polymer chain along the longitudinal direction of the elongation is certified by X-ray structural analysis. In case that a DNA-derived compound is used as a raw material polymer for the optical compensation film of the invention, preferably, the polymer is oriented in one direction by elongation. The alignment of DNA molecule along the longitudinal direction is certified by X-ray structural analysis (J. Chem. Soc., Chem. Commun., 1992, 1339).

Additionally, the optical compensation film of the invention has a slow axis along a direction orthogonal to the elongation direction via elongation. In case that a DNA-derived compound is used for the optical compensation film of the invention, the polymer material is oriented approximately parallel to the elongation direction, while the optical compensation film has a slow axis along a direction approximately orthogonal to the direction. This is because DNA base pairs are stacked together approximately orthogonally to the longitudinal direction of the helix.

(Molecular Orientation Axis)

As a measurement method for determining the slow axis of the optical compensation film of the invention, a sample of 30 mm×40 mm was moisture-adjusted at 25° C. and 65% RH for 2 hours, to calculate the molecular orientation axis with an automatic birefringence meter (KOBRA 21DH, Oji Scientific Instruments) to obtain the direction of the slow axis of the film.

(Optical Compensation Film of Lamination Type)

The optical compensation film of the invention is not limited to unilayer structure. The optical compensation film may have a laminated structure with a lamination of plural layers. In a mode of the laminated structure, the raw materials of the individual layers may not be of the same type. For example, an optical anisotropic layer using bar-like liquid crystal and an optical anisotropic layer using discotic liquid crystal may individually be used singly or may be used in combination. Additionally, an optical anisotropic layer comprising a polymer film and a liquid crystal compound may be laminated together.

(Polarizing Plate)

The optical compensation film of the invention may be in the form of an optical compensation film integral type polarizing plate prepared by laminating both the faces of a polarizing film with a protective film to prepare a polarizing plate, and then laminating an optical compensation film through an adhesive thereon. Additionally, the optical compensation film of the invention is laminated as a protective film of the polarizing plate, directly onto a polarizing film. In this case, a process of preparing a polarizing plate of for example polyvinyl alcohol-series is not specifically limited. Such polarizing plate can be prepared by general processes. For example, a process is listed, comprising modifying the surface of the optical compensation film with an alkali saponification process, a plasma process and a corona discharge process, then laminating the resulting optical compensation film onto both the surfaces of a polarizing film prepared by immersing and elongating polyvinyl alcohol film (PVA) in an iodine solution.

In liquid crystal display apparatuses, generally, a substrate containing liquid crystal is arranged between two polarizing plates. The polarizing plates with the optical compensation film applied thereto may satisfactorily be arranged at any position. If necessary, plural sheets of the optical compensation film of the invention may additionally be used in a liquid crystal display apparatus.

(Functional Layer)

When the optical compensation film of the invention is used as a protective film of a polarizing plate for use in a liquid crystal display apparatus, various functional layers may be given to the surface. They are for example cured resin layer (transparent hard-coat layer), glare protective layer, anti-reflection layer, ready adhesion layer, oriented layer, and liquid crystal layer-charging protective layer. These functional layers and the materials therefor include surfactants, lubricants, mat agents and the like. The Published Technical Report from the Japan Institute of Invention and Innovation (Kogi No. 2001-1745, issued on Mar. 15, 2001, the Japan Institute of Invention and Innovation) describes about it on page 32 to page 45. They may preferably be used in accordance with the invention.

(Liquid Crystal Display Apparatus)

For the liquid crystal display apparatus of the invention, the optical compensation film, a liquid crystal cell and a polarizing plate are used in combination. The optical compensation film, the liquid crystal cell and the polarizing plate preferably adhere together. For such adhesion, known pastes and adhesives may be used.

For the liquid crystal display apparatus of the invention, further, various functional films such as prism sheet and dispersion film may be used between members of the optical compensation film, the liquid crystal cell and the polarizing plate.

The optical compensation film of the invention and optical members using the same, such as polarizing plate, are applicable to various display modes of liquid crystal display apparatuses. As typical display modes, various display modes are proposed, such as IPS (in-plane switching), VA (vertically aligned), TN (twisted nematic), OCB (optically compensatory bend), STN (supper twisted nematic), ECB (electrically controlled liquid crystal), FLC (ferroelectric liquid crystal), AFLC (anti-ferroelectric liquid crystal), and HAN (hybrid aligned nematic). Further, display modes prepared by the orientation and division of the display modes are also proposed. The effect of the use of the film with the improved physico-chemical properties in accordance with the invention is great in liquid crystal display apparatuses of large display, in particular. Owing to the optical properties Re and Rth of the optical compensation film of the invention, the optical compensation film is preferably used in a liquid crystal display apparatus of IPS mode for large TV.

Additionally, preferable Re and Rth values of the optical compensation film vary slightly, depending on the retardation value of a liquid crystal along the thickness direction, the liquid crystal and the average refractive index "n" of the optical compensation film. Depending on the purpose, the Re and Rth values are preferably optimized.

EXAMPLES

The invention is now described in detail in the following Examples. However, the invention is never limited by them.

Example 1

(Preparation of DNA/Lipid Complex)

5 kg of DNA-sodium salts (average molecular weight of 30,000 bp) derived from salmon sperm (spermatozoon) were dissolved in 5,000 liters of water in a large tank A. 5 kg of n-dodecyltrimethylammonium bromide was dissolved in 500 liters of water in another large tank B. While maintaining the aqueous solutions in the large tanks A and B at 20° C. or less and agitating the aqueous solution in the tank B with an agitation wing, the aqueous DNA solution in the tank A was added to the tank B from the top. The DNA/lipid complex was generated in white precipitate in the tank B, which was then recovered. So as to wash off DNA and lipid remaining in water and never incorporated into the complex, the complex was washed with water as a purification procedure; so as to wash off lipid remaining in the precipitate but never incorporated into the complex, the complex was subjected to a washing procedure with diethyl ether. By thoroughly drying water and diethyl ether used in the washing procedure, the DNA/lipid complex of 8.5 kg was obtained.

(Preparation of Optical Compensation Film 001 by Solution Filming)

The DNA/lipid complex obtained by the procedure was dissolved in a solvent methylene chloride/methanol (4/1) to obtain a solution of 20% by mass. The solution was fed from the tank through a metal pipe to a die, for use in solution casting on a metal support to make a film. After solvent drying, the film was peeled off from the support and was then transferred; by carrying out fixed uniaxial elongation at 150% (2.5 as post-elongation length vs. the original length of 1) while retaining the width along the crosswise direction with a tenter clip, the resulting film was transferred, from which the solvent was again dried, to obtain the optical compensation film 001 with a film thickness of 10 μm and properties in Table 1, in a continuous roll form.

(Preparation of Optical Compensation Film 002)

By all the same procedures as in the preparation of the optical compensation film 001 except for the adjustment of die clearance to a final film thickness of 4 fold, optical compensation film 002 with a film thickness of 40 μm and properties shown in Table 1 was obtained in a continuous roll.

(Preparation of Optical Compensation Film 003)

By all the same procedures as in the preparation of the optical compensation film 001 except for the adjustment of die clearance to a final film thickness of 6 fold, optical compensation film 002 with a film thickness of 60 μm and properties shown in Table 1 was obtained in a continuous roll.

Example 2

(Preparation of Optical Compensation Film 004 by Solution Filming)

The same DNA/lipid complex as obtained in Example 1 was dissolved in a solvent methylene chloride/methanol (4/1) in a large tank, to obtain a solution of 20% by mass. The solution was fed from the tank through a metal pipe to a die, for use in solution casting on a metal support to make a film. After solvent drying, the film was peeled off from the support and was then transferred; by carrying out longitudinal uniaxial elongation at an effective film elongation of 100% (2.5 as post-elongation length vs. the original length of 1) due to difference in speed between a nip roll on the take-up side and a nip roll on the delivery side while retaining the distance between the nip rolls in front and behind at 0.6 m, the resulting film was transferred, from which the solvent was again dried, to obtain the optical compensation film 004 with a film thickness of 16 μm and properties in Table 1, in a continuous roll form.

(Preparation of Optical Compensation Film 005)

By all the same procedures as in the preparation of the optical compensation film 004 except for the adjustment of die clearance to a final film thickness of 4 fold, optical compensation film 005 with a film thickness of 64 μm and properties shown in Table 1 was obtained in a continuous roll.

(Preparation of Optical Compensation Film 006)

By all the same procedures as in the preparation of the optical compensation film 004 except for the adjustment of die clearance to a final film thickness of 6 fold, optical compensation film 006 with a film thickness of 96 μm and properties shown in Table 1 was obtained in a continuous roll.

Example 3

(Preparation of Film 007 by Melt Filming)

20 kg of the powder of the DNA/lipid complex obtained by the same process as in Example 1 was heated and dissolved in a pressure-resistant tank at 150° C., and was fed through a metal pipe to a melt die, for continuous melt filming. In transferring the film, the film was subjected to fixed uniaxial elongation at 150% (2.5 as post-elongation length vs. the original length of 1) along the longitudinal direction in a zone adjusted to a temperature of 110° C. while retaining the width along the crosswise direction with a tenter clip, to obtain an optical compensation film 007 with a film thickness of 40 μm and properties in Table 1, in a continuous roll form.

Comparative Example 1

(Preparation of Styrene-Series Polymer Film 008)

90 parts by mass of a monomer mixture shown below in (B) were graft-polymerized with 10 parts by mass of a copolymer shown below in (A), to prepare 170 g of a styrene-series polymer, which was then dissolved in 830 g of methylene dichloride.
(A) Styrene/butadiene copolymer (mass ratio: 20/80)
(B) Styrene/acrylonitrile/α-methylstyrene (mass ratio: 60/20/20)

The resulting solution was poured on a glass plate to a film thickness of 60 μm after drying, which was then left to stand alone at ambient temperature for 5 minutes and dried in warm air at 45° C. for 20 minutes. The resulting film was peeled off from the glass plate. The film was attached on a rectangular frame, for drying at 70° C. for one hour. After drying at 110° C. for another 15 hours, the film was subjected to fixed uniaxial elongation to a ratio of 150% along the longitudinal direction (2.5 as post-elongation length vs. the original length of 1) while retaining the film along the width direction, using a table type tensile tester (manufactured by Toyo Seiki Seisaku-sho) under a condition of 115° C. In the aforementioned manner, an elongated film 008 of a styrene-series polymer having properties shown in Table 1 was prepared.

Various properties of the optical compensation films 001 through 007 as obtained above in Examples 1 through 3 and the optical compensation film 008 obtained in Comparative Example 1 are shown collectively in Table 1.

|  |  | Example 1 | | | Example 2 | | | Example 3 | Comparative Example 1 |
|---|---|---|---|---|---|---|---|---|---|
| sample name | | 001 | 002 | 003 | 004 | 005 | 006 | 007 | 008 |
| Filming process | | Solution filming | | | Solution filming | | | Solution filming | — |
| Elongation | Process | Fixed uniaxial elogation | | | Longitudinal uniaxial elongation | | | Fixed uniaxial elogation | |
| | Ratio (%) | 150 | | | 100 | | | 150 | |
| Raw material polymer | Raw material | DNA/lipid complex | | | | | | | PSt |
| Helical property (cotton effect) | CD spectrum | Cotton effect at 260 nm | | | | | | | none |
| Transmittance | % | 92 | 92 | 92 | 92 | 92 | 92 | 90 | 88 |
| Haze | % | 0.35 | 0.36 | 0.37 | 0.35 | 0.38 | 0.39 | 0.48 | 0.62 |
| Film thickness | μm | 10 | 40 | 60 | 16 | 64 | 96 | 40 | 55 |
| Re | nm | −68 | −278 | −420 | −55 | −225 | −348 | −248 | 276 |
| Rth | nm | −12 | −49 | −79 | −120 | −492 | −748 | −50 | 52 |
| Re/d (after elongation) | | 0.0068 | 0.0070 | 0.0070 | 0.0034 | 0.0035 | 0.0036 | 0.0071 | 0.0050 |
| Rth/d (after elongation) | | 0.0012 | 0.0012 | 0.0013 | 0.0075 | 0.0077 | 0.0078 | 0.0013 | 0.0009 |
| Light leakage during panel mounting (example 4) | | — | A | — | — | — | — | A | C |

Example 4

(Preparation of Optical Compensation Film Integral Type Polarizing Plate)

Two rolls of a commercially available cellulose acetate film (Fujitac TD80UL manufactured by Fuji Film Co., Ltd., Re=2 mm, Rth=48 nm) were prepared; each surface was treated by alkali saponification; the resulting rolls were laminated in a roll-to-roll manner onto both the faces of a polarizing film prepared by allowing iodide to be adsorbed onto an elongated polyvinyl alcohol film, using a polyvinyl alcohol-series adhesive, to obtain a polarizing plate 101 in a continuous length (the absorption axis is parallel to the longitudinal direction). It was verified that the polarizing properties of the polarizing plate 101 were satisfactory.

The polarizing plate 101 prepared above and the optical compensation film 002 of the invention were laminated together, using a paste, to prepare an optical compensation film integral type polarizing plate 102. In the same manner, optical compensation film integral type polarizing plates 107, 108 were prepared from the optical compensation film 007 and the sample 008 obtained in Comparative Example 1.

(Preparation of Polarizing Plate 201)

One roll of a commercially available cellulose acetate film (Fujitac TD80UL manufactured by Fuji Film Co., Ltd., Re=2 mm, Rth=48 nm) and one roll of a commercially available cellulose acetate film (Z-tac manufactured by Fuji Film Co., Ltd., Re=0 mm, Rth=0 nm) were prepared; these films were treated by saponification; the resulting rolls were laminated in a roll-to-roll manner onto both the faces of a polarizing film prepared by allowing iodide to be adsorbed onto an elongated polyvinyl alcohol film, using a polyvinyl alcohol-series adhesive, to obtain a polarizing plate 201 in a continuous length (the absorption axis is parallel to the longitudinal direction). It was verified that the polarizing properties of the polarizing plate 201 were satisfactory.

(Preparation of Liquid Crystal Cell of IPS Mode)

Electrodes were arranged on a glass substrate so that the distance between adjacent electrodes might be 20 μm; a polyimide film was arranged thereon as a film to be oriented, for rubbing treatment. A polyimide film was arranged on one of the surfaces of another glass substrate separately prepared, for rubbing treatment to prepare an oriented film. Two glass substrates were overlaid and laminated together in such a manner that the oriented films were faced to each other; the distance (gap; d) between the substrates was 3.9 μm; and the rubbing directions of the two glass substrates were made parallel to each other. Subsequently, a nematic liquid crystal composition with refractive anisotropy (Δn) of 0.0769 and dielectric anisotropy (Δε) of positive 4.5, was sealed therein. The value of d·Δn was 300 nm.

(Assessment of Arrangement in Liquid Crystal Cell of IPS Mode)

The optical compensation film integral type polarizing plate 102, the polarizing plate 201 and the cell of IPS mode as prepared above were arranged in a layer structure of FIG. 2 in a liquid crystal display apparatus. In the same manner, the optical compensation film integral type polarizing plates 107, 108 were arranged in liquid crystal display apparatuses. In Comparative Example 2, not the optical compensation film integral type polarizing plate 102 in the structure of FIG. 2 but the polarizing plate 101 without the optical compensation film 002 was arranged in a layer structure of FIG. 3 in a liquid crystal display apparatus.

(Measuring Light Leakage from Liquid Crystal Display Apparatus)

The liquid crystal display apparatuses thus prepared were observed during black display at 60° from the left oblique direction to measure light leakage. The optical compensation films of the invention were arranged on the side of observation toward the IPS mode cell. The results are shown in Table 1, where assessment was done as follows: no light leakage observed=A; slight light leakage observed=B; and apparent light leakage observed=C. Less light leakage and almost no color change were observed in all the cases of the optical compensation films of the invention, compared with Comparative Example 1 (Comparative Example 2 was also assessed as C).

Example 5

(Preparation of an Optical Compensation Film No. 009 by Polymer Blending)

The following composition was charged in a mixing tank, and agitated therein under heating to dissolve the individual ingredients, to prepare a polymer mix solution.

(Composition of Polymer Mix Solution)

Powder of the DNA/lipid complex prepared in Example 1: 70 parts by mass
Cellulose acetate with an acetyl substitution level of 2.85: 13 parts by mass
Methylene chloride (first solvent): 64 parts by mass
Methanol (second solvent): 16 parts by mass The polymer mix solution passed from the tank through a metal tube and was cast from a die onto a metal support for solution-casting, to prepare a film. After drying the solvents, the film was peeled off from the support for transfer under a fixed monoaxial elongation at 150% (the elongated length at a ratio of 2.5 to the original length of 1) along the longitudinal direction, while the width of the film was retained as it was along the crosswise direction with a tenter clip. Then, the solvents were dried off again, to obtain the optical compensation film No. 009 with a 40-μm film thickness, Re=−256 nm and Rth=−30 nm, the compensation film No. 009 having the helical property on the basis of the Cotton effect at 225 nm.

Using the optical compensation film No. 009, an optical compensation film-integrated polarization plate was prepared by the same procedures as in Example 4, to mount the resulting polarization plate in the same layer constitution onto a liquid crystal display apparatus for assessment. The leakage light from the liquid crystal display apparatus was measured. No leakage light was observed, consequently, which indicates that the optical compensation film No. 009 of the invention has such a great performance as described above.

The present application claims foreign priority based on Japanese Patent Application (JP 2005-346428) filed Nov. 30 of 2005, the contents of which is incorporated herein by reference.

What is claimed is:

1. A polarizing plate comprising: a polarizing plate stacked onto an optical compensation film having: a retardation value Re in a film plane of the optical compensation film; and a retardation value Rth in a thickness direction of the optical compensation film, the retardation value Re and Rth being reduced by an elongation, satisfying the formulae (1) and (2) without the elongation, and satisfying the formulae (3) to (6) after the elongation:

$$Re = 0 \text{ to } 30 \text{ nm} \quad (1)$$

$$Rth = -50 \text{ to } 50 \text{ nm} \quad (2)$$

$$Re(n) = -500 \text{ to } 0 \text{ nm} \quad (3)$$

$$Rth(n) = -800 \text{ to } 0 \text{ nm} \quad (4)$$

$$Re(n) - Re(0) < 0 \quad (5)$$

$$Rth(n) - Rth(0) < 0 \quad (6)$$

wherein in the formula (3), Re is represented as positive value in an elongation direction and as negative value in a direction perpendicular to the elongation direction; in the formula (4), Rth is represented as negative value when a refractive index in the thickness direction is larger than a refractive index in the film plane direction; in the formulae (5) and (6), n represents an elongation ratio (%); and Re and Rth after the elongation at n % are represented as Re(n) and Rth(n), respectively, wherein n is 0.5 to 300; wherein the optical compensation film comprises a raw material polymer, wherein the raw material polymer comprises a polymer having a helix structure; wherein the polymer having the helix structure comprises at least one compound derived from a deoxyribonucleic acid; wherein the at least one compound derived from the deoxyribonucleic acid comprises a deoxyribonucleic acid-lipid complex obtained by electrostatically allowing a phosphate anion part of the deoxyribonucleic acid to interact with a cationic lipid.

2. The polarizing plate as claimed in claim 1, wherein the retardation value Re and Rth of the optical compensation film after elongation satisfy the formulae (7) and (8):

$$|Re(n)/d(n)| \geq 0.001 \quad (7)$$

$$|Rth(n)/d(n)| \geq 0.001 \quad (8)$$

wherein in the formulae (7) and (8), d(n) represents a film thickness (nm) of the optical compensation film when the elongation ratio is n (%).

3. The polarizing plate as claimed in claim 1, wherein the polymer having the helix structure, of the optical compensation film, has a side-chain component extended in a direction intersecting with the helix axis at one of an internal and an external side of the helix structure.

4. The polarizing plate as claimed in claim 3, wherein the side-chain component of the polymer having the helix structure is an ultraviolet absorption group in a plane substantially perpendicular to the helix axis.

5. The polarizing plate according to claim 1, wherein the optical compensatory film is produced by mixing the raw material polymer with another polymer.

6. The polarizing plate according to claim 1, wherein the compound derived from the deoxyribonucleic acid, of the optical compensatory film, is oriented along the elongation direction by the elongation of the optical compensation film, and the optical compensation film has a slow axis along a direction perpendicular to the elongation direction.

7. A liquid crystal display apparatus comprising:
at least one of an optical compensation film having:
a retardation value Re in a film plane of the optical compensation film; and
a retardation value Rth in a thickness direction of the optical compensation film, the retardation value Re and Rth being reduced by an elongation, satisfying the formulae (1) and (2) without the elongation, and satisfying the formulae (3) to (6) after the elongation:

$$Re = 0 \text{ to } 30 \text{ nm} \quad (1)$$

$$Rth = -50 \text{ to } 50 \text{ nm} \quad (2)$$

$$Re(n) = -500 \text{ to } 0 \text{ nm} \quad (3)$$

$$Rth(n) = -800 \text{ to } 0 \text{ nm} \quad (4)$$

$$Re(n) - Re(0) < 0 \quad (5)$$

$$Rth(n) - Rth(0) < 0 \quad (6)$$

wherein in the formula (3), Re is represented as positive value in an elongation direction and as negative value in a direction perpendicular to the elongation direction; in the formula (4), Rth is represented as negative value when a refractive index in the thickness direction is larger than a refractive index in the film plane direction; in the formulae (5) and (6), n represents an elongation ratio (%); and Re and Rth after the elongation at n % are represented as Re(n) and Rth(n), respectively, wherein n is 0.5 to 300; and a polarizing plate according to claim 1.

8. A liquid crystal display apparatus as claimed in claim 7, comprising a liquid crystal cell of In-Plane-Switching mode.

* * * * *